United States Patent [19]

Guertin et al.

[11] Patent Number: 4,485,594
[45] Date of Patent: Dec. 4, 1984

[54] SURFACE GRINDING MACHINE

[75] Inventors: Raymond J. Guertin, East Greenwich; Chuhong Kang, North Kingston; Peter P. Matthews, West Warwick, all of R.I.

[73] Assignee: Brown & Sharpe Manufacturing Company, North Kingston, R.I.

[21] Appl. No.: 415,137

[22] Filed: Sep. 7, 1982

[51] Int. Cl.³ .............................................. B24B 49/00
[52] U.S. Cl. .................................... 51/165.71; 51/35; 51/92 R; 51/166 R; 51/231
[58] Field of Search .............. 51/45, 35, 165.71, 34 F, 51/165 TP, 92 R, 231, 166 R

[56] References Cited

U.S. PATENT DOCUMENTS

| 2,705,427 | 4/1955 | Schipper | 51/34 F |
|---|---|---|---|
| 2,729,034 | 1/1956 | Frank | 51/231 |
| 2,923,102 | 2/1960 | Couture | 51/92 R |
| 2,927,403 | 3/1960 | Holland | 51/92 R |
| 3,118,254 | 1/1964 | Lella | 51/92 R |
| 3,330,072 | 7/1967 | Janis, Jr. | 51/35 |
| 3,815,293 | 6/1974 | Karbowski | 51/231 |
| 4,274,231 | 6/1981 | Verega | 51/165.71 |

FOREIGN PATENT DOCUMENTS 2043300  10/1980  United Kingdom ............. 51/165.71

*Primary Examiner*—Harold D. Whitehead
*Attorney, Agent, or Firm*—Wolf, Greenfield & Sacks

[57] ABSTRACT

A surface grinding machine capable of being computer operated and having a multi-function capability for performing conventional slot and surface, plunge, side wheel, creep feed and short stroke grinding in any desired combination or sequence. A table containing a workpiece is driven by a highly tensioned, circulating primary belt drive system capable of providing a desired grind with a desired length and speed upon command. The base is formed as a unitary body, and the table travels on ways which are formed integrally with the base. The column containing the grinding wheel assembly moves with respect to the workpiece along cross ways transverse to the table ways which are supported along their length by the base. The column drive is coupled to the column by a mechanically and thermally isolated ball screw nut mount which eliminates screw nut shoulder weave and reduces thermal conduction into the column. A housing containing the grinding wheel moves vertically along ways in the column and a magnetic brake is utilized in the vertical drive for the wheel housing to prevent damage to the workpiece during power interruption. Both the vertical ways for the wheel housing and the horizontal cross ways for the column are self-aligning and include a shoe and a cage containing needle roller bearings which is driven by a rack and pinion arrangement along the ways. A computer terminal may be provided for automatic control of the machine, as well as a manual control panel which is slidable across the front of the machine for convenience in operation thereof.

34 Claims, 16 Drawing Figures

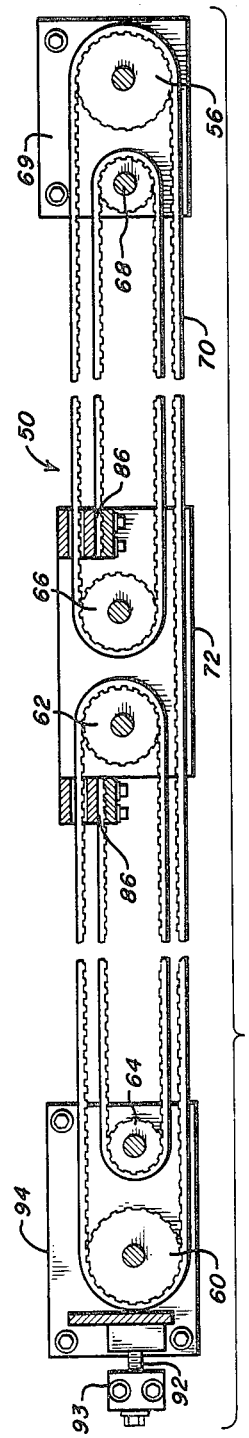
FIG. 4
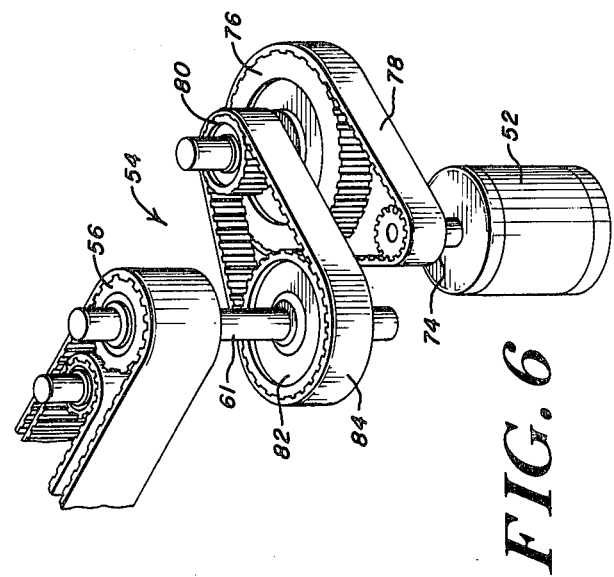
FIG. 6
FIG. 5

SURFACE GRINDING MACHINE

FIELD OF THE INVENTION

This invention relates generally to precision machine tools and more particularly to a multi-functional, computer controllable surface grinding machine.

BACKGROUND OF THE INVENTION

Most prior art surface grinding machines are hydraulically powered and are dedicated to a specific grinding function such as creep feed grinding, shortstroke grinding, or pendulum grinding. Presently, there exists no one machine which can perform all of these grinding functions without alteration or replacement of parts thereof. As a result, if a user must perform each of these different grinds on a workpiece, three different machines are required, and the workpiece must be moved from machine to machine to perform the desired grinds in the desired sequence. Such an operation can be extremely time consuming, and it is very expensive to have to maintain several different machines.

Existing machines used for pendulum type grinding at speeds of about 1200 inches per minute or greater generally use a hydraulic system as a primary drive for the table carrying the workpiece. Although a hydraulic drive is sufficient for pendulum type grinding, it is unacceptable for creep feed grinding at speeds in the range of ten inches per minute, or less. For such slower speeds, a separate and dedicated machine is required, generally having a steel band or steel cable drive or a ball screw nut drive, or a rack and pinion drive.

In addition, such existing grinding machines are subject to errors and must be carefully monitored to perform the high precision grinds required for modern applications. In particular, most such machines have a first set of ways upon which the table containing the workpiece travels. A second set of ways perpendicular to the first set of ways is provided for travel of a column containing the grinding wheel and the wheel housing assembly. Generally, the base supporting the first set of ways is formed separately from the base supporting the second set of ways, and the two bases are affixed to one another by conventional welding or bolting techniques. As a result, if the two bases are not precisely assembled, misalignment can occur, resulting in grinding errors. In addition, use over a period of time can produce a slight misalignment of the bases. A two-base construction also tends to be elastic in the vertical and horizontal plane, thus contributing to errors in precision grinding. In prior art machines, both the first and the second set of ways generally extend beyond their suporting bases and are insufficiently supported at their ends. This insufficient support can result in errors in grinding because of flexing of the ways during the operation of the machine and because of machine induced vibrations. The hydraulic reservoir and all of the hydraulic apparatus for prior art pendulum type grinding primary drives are generally disposed within the base beneath the first set of ways. The hydraulic reservoir and apparatus generate a considerable amount of heat, and regardless of the precautions taken, thermal gradients result in the first set of ways and the table. These gradients can produce distortion or misalignment of the ways and table, which may produce errors in the grinding operation. Also, hydraulic drives are subject to other problems, such as leaks, inefficiency and require filtration and/or heat exchangers.

Some existing machines, especially creep feed grinding machines, use a threaded shaft and a ball screw nut arrangement for the primary drive. Such a drive is subject to weave as the shaft is rotated because of stresses on the shaft and because of minor imperfections in the threading. In addition, heat generated by the interaction of the shaft and the nut is transferred to the table and ways, also possibly producing errors in the grinding operation. In order to produce the precision grinds desired, the column containing the wheel housing must be maintained in a precisely vertical orientation and must frequently be aligned prior to use to assure precision grinding.

During periods of power interruption or permanent power cut-off, the weight of the grinding wheel tends to carry it downwardly into the workpiece. Such movement as the grinding wheel is dropping down can cause irreparable damage to the work piece. In order to prevent such damage, conventional grinders utilize counterweights or pneumatic or hydraulic systems to maintain the wheel head position during power interruption. Such prior art devices are often clumsy, inefficient, require external power sources, and do not act instantaneously.

Most prior art surface grinders are manually operated and controlled, utilizing hand-held wheels. These wheels are not always ideally positioned for grinding operations, and must be continually monitored by the operator to assure precision grinding. In addition, only one grind along one axis may be performed at any one time, and if a grind on a second or third axis is desired, this must be performed in a separate operation.

SUMMARY OF THE INVENTION

An object of this invention is to provide a surface grinding machine capable of performing multiple functions with a single apparatus.

Another object of this invention is to provide a surface grinding machine capable of performing a high precision grind on a workpiece.

A further object of this invention is to provide a surface grinding machine capable of being controlled by a programmable computer.

In accordance with the above objects, this invention generally relates to a single surface grinding machine capable of performing multiple functions, such as conventional slot and surface grinding, plunge grinding, side wheel grinding, creep feed grinding and shortstroke grinding using one or more different wheel dressing methods on multiple surfaces of a workpiece in one set-up. This machine is capable of highly precise grinds producing consistent part geometry, surface integrity and high production rates.

The above described results are achieved by using for a primary table drive a highly responsive, recirculating belt drive system. The drive belt is looped to form multiple strands which allows it to be preloaded for the stiffness required to produce the high precision movement desired. The belt is driven by a servo motor which is coupled thereto by a double reduction unit. This belt drive eliminates the problems associated with conventional hydraulics and permits the wide range of grinds described.

A fixed, unitary base is provided for supporting both the table ways and the cross feed column ways. The table ways are preferably formed integrally with the base, and both the table ways and cross feed column ways are fully supported along their lengths by the unitary base. Thus, precise alignment is assured.

The cross feed drive for the column includes a thermally and mechanically isolated ball screw nut which prevents transfer of screw nut shoulder weave to the column and minimizes thermal gradients in the machine column or table resulting from heat generated within the ball screw nut. The vertical wheel housing drive within the column is provided with a magnetic brake which not only prevents the grinding wheel from falling on the workpiece during power interruptions but actually lifts the grinding wheel off the workpiece.

The vertical ways within the column, along which the wheel housing moves, and the cross feed column ways are both preloaded and are both provided with needle roller bearings disposed within a bearing cage which moves along the ways with a rack and pinion arrangement and which cooperates with a shoe to provide a damped, low friction movement. The shoe plate disposed on the cross bed column ways includes a rounded ridge which cooperates with pads on the underside of the column to render it self-orienting beneath the column to insure that the column always remains precisely at 90 degrees with respect to the table. An oil bath also surrounds the shoe and bearing cage to provide the desired damping.

The surface grinding machine of this invention is capable of being computer controlled to produce the grind desired on a workpiece affixed to the table. Once the computer has been pre-programmed and a workpiece has been placed in position, the entire operation may be performed without the need for again setting up the operation. The computer can program the grinder to perform any operation desired in any sequence on any surface of the workpiece. Manual control is also permitted utilizing an operator's panel which slides along rails into a convenient location allowing for a fast and accurate set-up. During nonuse, the manual operators' panel can be slid out of the way.

DESCRIPTION OF THE DRAWINGS

The objects, advantages and features of this invention will be more clearly appreciated from the following detailed description taken in conjunction with the accompanying drawing in which:

FIG. 4 is a broken, top view of the belt drive of FIG. 2;

FIG. 5 is a partial, perspective view of the bracket of the belt drive of FIG. 4;

FIG. 6 is a perspective view of the belt reduction unit of FIG. 4;

DETAILED DESCRIPTION OF THE PREFERRED EMBODIMENT

Figure 1:
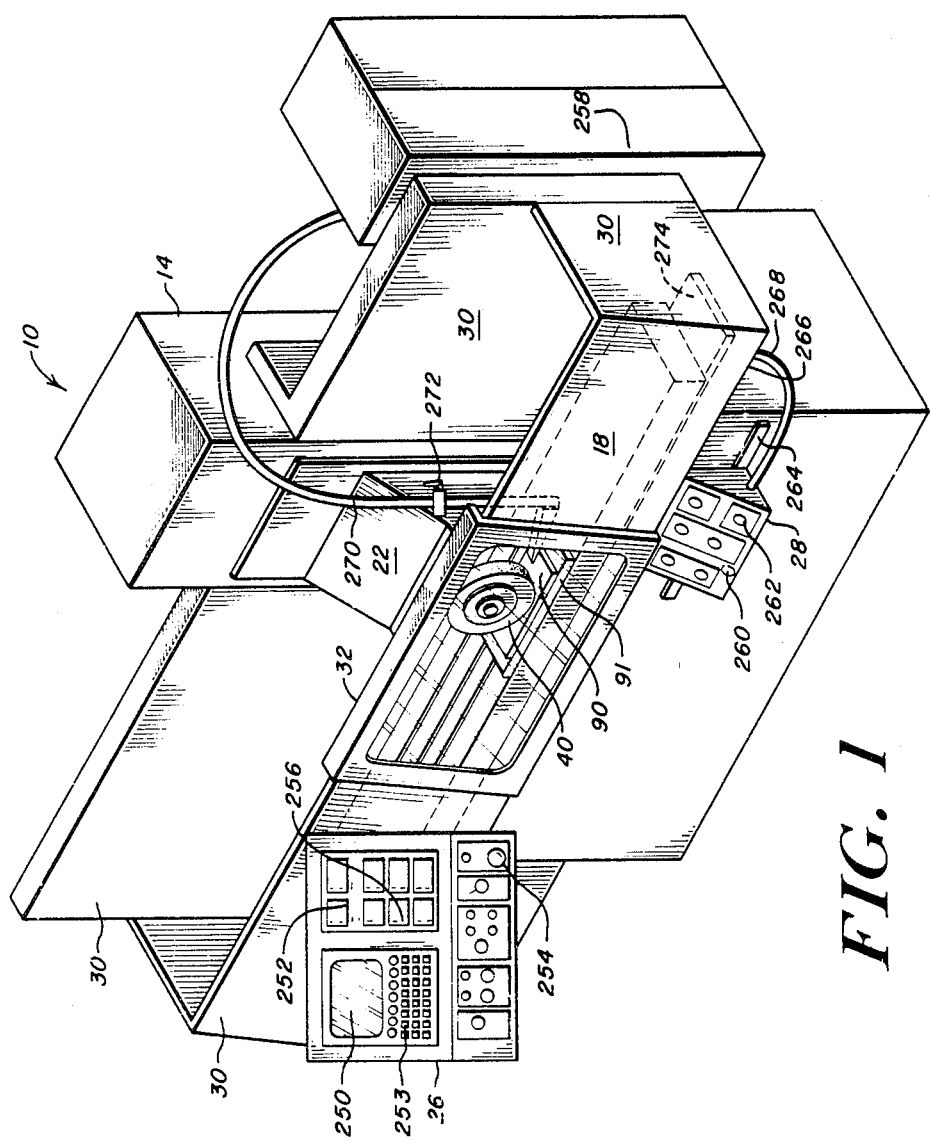
FIG. 1 is a pictorial representation of the surface grinding machine of this invention.
Figure 2:
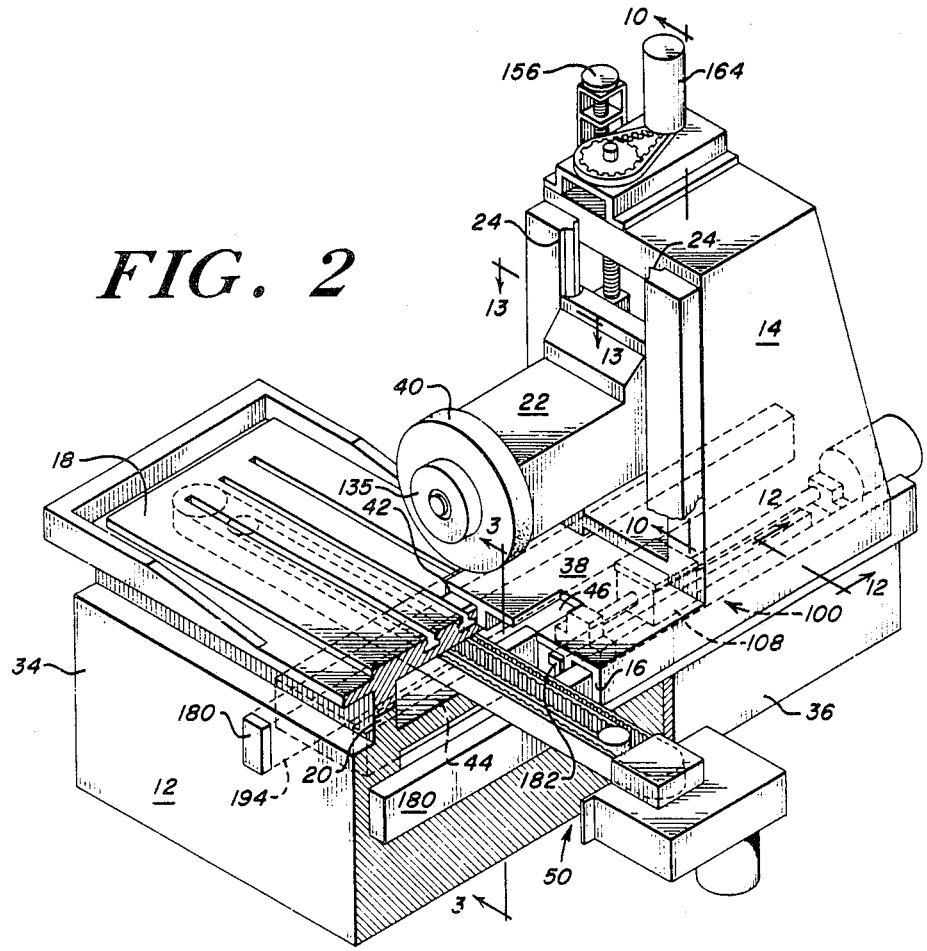
FIG. 2 is a partially cutaway perspective review of the machine of FIG. 1.
Figure 3:
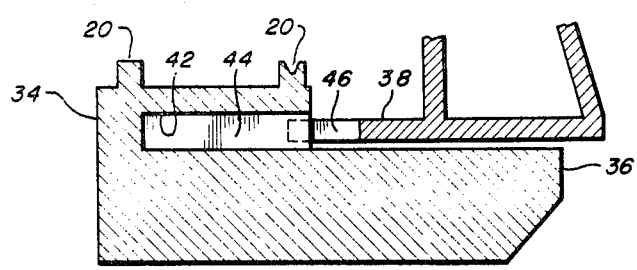
FIG. 3 is a partial cross-sectional view taken along the line 3—3 of FIG. 2.

With reference now to the drawing, and more particularly to FIGS. 1, 2 and 3 thereof, the surface grinding machine 10 of this invention will be described. Grinding machine 10 includes a base 12, a vertical column 14 slidable along base 12 on cross-feed ways 16, a table 18 slidable along base 12 on table ways 20 which are normal to ways 16, grinding wheel housing 22 adapted to ride within column 14 along vertically oriented wheel housing ways 24, a rotatable grinding wheel 40 extending from wheel housing 22 for performing work on a workpiece 90 on table 18, computer control panel 26 and manual control panel 28.

The construction of base 12 will now be described with particular reference to FIGS. 1, 2 and 3. Base 12 includes two portions, the first portion 34 which supports ways 20 and a second portion 36 which supports ways 16. All of base 12, including portions 34 and 36 is formed as a unitary piece so as to provide the desired stability, damping, and strength to the base for precision grinding. This construction overcomes the inherent elasticity of independent members as found in prior art two-piece bases having approximately several times the stiffness thereof. This one-piece construction of base 12 also provides precise way geometry in the intersecting and overlapping planes of ways 16 and 20.

Column 14 has a toe 38 which extends forwardly thereof for strength and stability and which must ride under ways 20 so that grinding wheel 40 can perform operations on a workpiece 90 disposed on table 18. To accommodate toe 38, a tunnel 42 is provided under ways 20 with ways 20 bridging tunnel 42. A vertical bridge support 44 is disposed within tunnel 42 and extending along the length of tunnel 42 generally normal to ways 20 to provide ways 20 with the necessary structural support thereunder. Support 44 is particulary important, since tunnel 42 passes directly under grinding wheel 40, the point upon which work is performed in a precision manner on a workpiece and without bridge support 44 there would be a loss of support and produce vibrations which would not permit the precision grinding desired. To accommodate bridge support 44, a slot 46 is formed in toe 38. Slot 46 is sufficiently wide so that no portion of toe 38 touches bridge support 44 at any time during movement of column 14. Tunnel 42 is also sufficiently long so as to permit the desired degree of travel of column 14 without interference with toe 38.

One of ways 20 is preferably a V-way, while the other of ways 20 is preferably a flat way, as shown in FIG. 3, to insure low friction travel of table 18 and proper alignment thereof. To provide maximum precision and stability in the operation of this machine, it is preferred that ways 20 are formed integrally with base 12, as shown in FIGS. 1, 2 and 3. In this embodiment, once ways 20 have been molded into base 12, a coating of a low friction material is applied to ways 20, molded thereto and cured to permit low friction travel of table 18 therealong and to provide a permanent running way bearing surface. Examples of an acceptable coating material include either Moglice or SKC-3 which is produced by Gleitbelag-Technik. As an alternative embodiment, ways 20 can be formed separately of base 12 and then grouted thereto in the desired parallel alignment. This technique is less desirable because of the difficulty in aligning ways 20 and providing the desired precise horizontal orientation thereof and because of the greater likelihood of stress induced deformation thereof with time or temperature differentials.

In either embodiment, ways 20 and 16 are both supported along their entire length by portions 34 and 36 respectively of base 12 to provide full support thereof and to eliminate problems of prior art machines associated with overhang of the ways. In this manner, ways 20 and 16 are maintained at all times in a horizontal position and provide a precisely straight bed for travel of table 18 and column 14 respectively and are not subject to bending or warping at the ends thereof.

Typically, base 12 and ways 20 are molded of an epoxy-granite material such as Granitan, although cast iron or steel could also be utilized.

The primary feed drive 50 for moving table 18 is a belt drive as opposed to the hydraulically driven prior art devices, and the use of a belt drive permits the one unit to perform all types of grinds which previously required separate, dedicated machines, such as conventional slot and surface, plunge, side wheel, pendulum, short stroke, and creep feed grinding. In addition, each of these grinds may be provided on one workpiece and in any sequence and for any length of time. The belt drive system of this invention will now be described with particular reference to FIGS. 4-6.

Belt drive 50 includes a servo motor 52, a double reduction unit 54, a drive pulley 56, idler pulleys 60, 62, 64, 66 and 68, timing belt 70 and bracket 72. Belt 70 is driven by servo motor 52 which may be a standard DC servo motor operable at any speed for any length of time in either direction upon command. Motor 52 is coupled to belt 70 by double reduction unit 54. Unit 54 includes a first small diameter pulley 74 which is driven directly by motor 52. Pulley 74 in turn drives a larger diameter pulley 76 by a timing belt 78. Pulley 76 is coupled to a coaxial smaller diameter pulley 80 which drives a larger diameter pulley 82 by belt 84. Belts 78 and 84 are typically similar to belt 70. Pulley 82 in turn rotates pulley 56 coupled thereto by shaft 61.

It has been found that a preloaded multi-strand or looped belt provides the stiffness to the belt required for a highly responsive drive for table 18 which can be operated at high and low speeds. Experimentation has shown that a single strand belt does not provide the required stiffness, while if too many loops are provided, the incremental increase in stiffness is minimal and the drive system cannot be fitted into the allotted space, which is the width of the bracket 72 secured to table 18. Thus, it was discovered that an optimal belt stiffness was achieved for an optimum of lateral space occupied by the belt by the quadruple strand, six pulley system illustrated in FIGS. 4 and 5. One end of belt 70 passes from drive pulley 56 to idler pulley 60, around idler pulley 62, back around idler pulley 64 and finally to bracket 72 where the one end of belt 70 is anchored along wall 86 thereof. The other end of belt 70 has a similar configuration, passing from drive pulley 56 around idler pulley 66, back around idler pulley 68 and finally to wall 86 of bracket 72 where the other end is anchored. Idler pulleys 60 and 64 are journaled in bracket 94 and pulleys 56 and 68 are journaled in bracket 69 beneath table 18 between ways 20, while pulleys 62 and 66 are journaled within bracket 72 between upper and lower walls 88 thereof. As indicated, table 18 is secured to bracket 72 along upper wall 88 thereof, and bracket 72 is suspended from table 18 so that movement of bracket 72 produces comparable low friction movement of table 18 along ways 20. The desired degree of stiffness of belt 70 is provided by adjustment of preload screw 92 which is anchored into base 12 by bracket 93 and which is threadably coupled to bracket 94. Securing the ends of belt 70 to bracket 72 and stretching it between vertically oriented pulleys 56, 60, 62, 64, 66 and 68 prevents deformation of the belt during operation and insures precision grinding.

Oscillation of table 18 beneath stationary grinding wheel 40 with a preset stroke and a preset speed permits the desired grinding operation to be performed on a workpiece. Table 18 may be moved at a speed as little as 0.4 inch per minute for creep feed grinding and at a speed great as 1200 inches per minute in each direction for a pendulum type grinding. The length of the stroke may be set at any amount desired by controlling the degree of rotation of the armature of servo motor 52. The precise speed of feed is controlled by the rate of rotation of servo motor 52 and by the frequency of reversal of direction thereof. The high degree of stiffness of the belt prevents cogging or overhaul of table feed by grinding wheel 40. Belt 70, as well as belts 78 and 84 are typically high strength timing belts with grooves formed therein for meshing with the desired pulleys, and belt 70 is typically about four inches wide.

The cross feed drive 100 for column 14 will now be described with particular reference to FIGS. 7 and 8. Cross feed drive 100 permits grinding wheel 40 to be positioned on the workpiece in the desired transverse location with respect to ways 20 and allows grinding wheel 40 to be slowly advanced in a direction transverse of ways 20 as the grinding proceeds, as desired by the operator. Cross feed drive 100 is a screw drive and includes threaded screw shaft 102, servo motor 104, belt drive 106, coupling 108, and mounting 111 and bracket 110. Servo motor 104, which is typically a DC motor, is coupled to shaft 102 by belt drive 106. Belt drive 106 is a reduction unit which includes pulley 112, pulley 114 and belt 116 mounting 111 secures motor 104 and belt drive 106 to base 12. The other end of shaft 102 is journaled in bracket 110 to permit relatively free and frictionless rotation thereof. Coupling 108 is bolted to the underside of column 14, as shown, to produce movement thereof along ways 16 in response to servo motor 104.

Coupling 108 includes a header plate 118, a ball screw nut 120 non-movably secured to header plate 118, bracket 122 secured to the underside of column 14 and a pair of somewhat flexible arms 124 coupling bracket 122 to header plate 118. Nut 120 is a standard ball screw nut, and because of imperfections in nut 120 and in the threading of shaft 102 and because of friction generated by the interaction between the threads of shaft 102 and nut 120, a certain weave and rotational torque is applied to nut 120 during rotation of shaft 102. Arms 124 are disposed on opposite sides of shaft 102 and are sufficiently flexible to permit header plate 118 and nut 120 attached thereto to rotate slightly with respect to bracket 122 and to flex in a direction normal to shaft 102 so that any weave or torque produced by the interaction of shaft 102 and nut 120 is not transmitted to bracket 122 and thus is not transmitted to column 14. In this manner, the smooth, precise, level feed of column 14 is not disturbed. In addition, since only arms 124 couple bracket 122 to plate 118 and nut 120, any heat generated by the interaction of nut 120 and shaft 102 is partially thermally isolated from bracket 122 and thus column 14. This allows maintenance of column 14 at a nearly constant temperature all during feed thereof and prevents the development of temperature gradients therein, thus preventing distortions caused thereby. Typically, arms 124 are formed of a flexible steel and act as a double cantilever while providing good torsional stability. Arms 124 are preferably 1½ to three inches in length to provide the desired level of elasticity, thermal isolation and elimination of mechanical weave.

Figure 7:
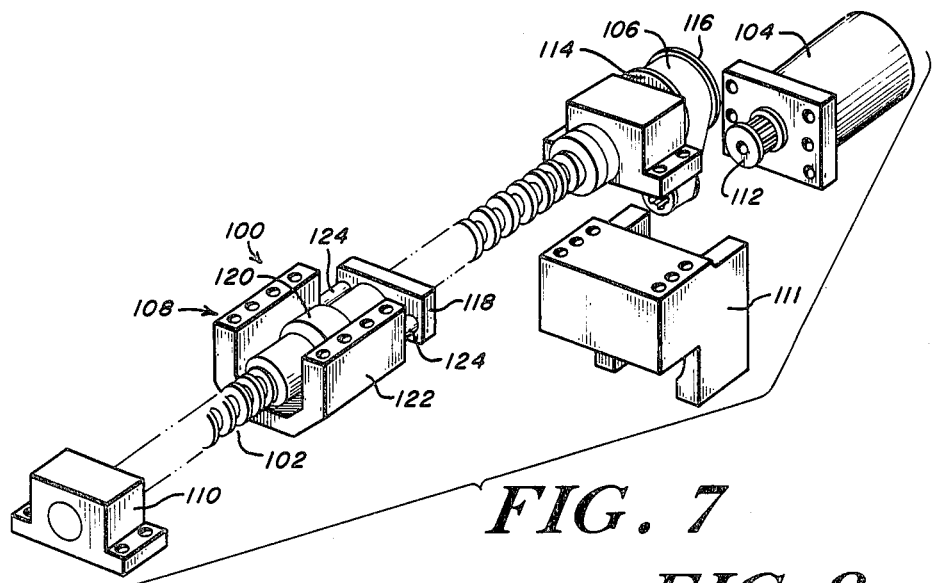
FIG. 7 is a partially exploded view of the cross feed drive of FIG. 2.
Figure 8:
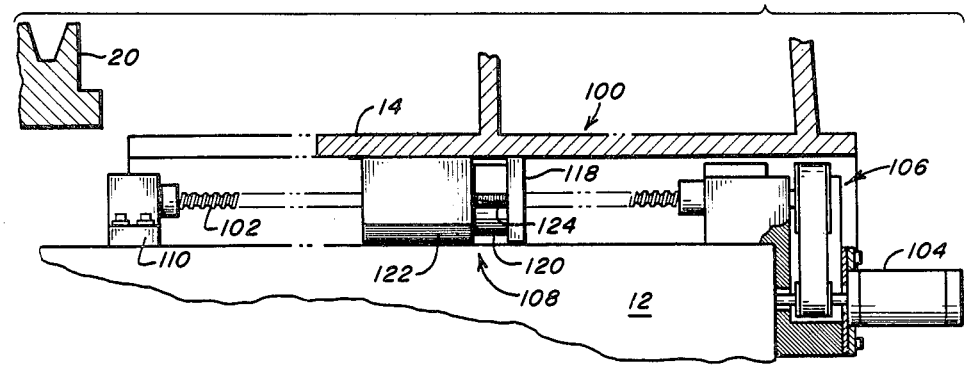
FIG. 8 is a side view of the cross feed drive of FIG. 7.
Figure 9:
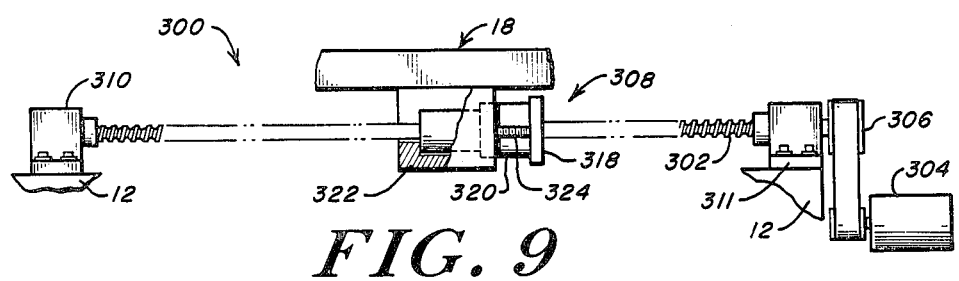
FIG. 9 is a side view of an alternative table drive.

If it is desired to provide a dedicated creep feed grinder, a table feed drive similar to drive 100 as illustrated in FIGS. 7 and 8 can also be used as a primary feed drive in place of primary feed drive 50 for driving table 18, as illustrated by drive 300 of FIG. 9. Belt Drive 50 would be removed and replaced by drive 300 which is similar to cross feed drive 100. Shaft 302 is journaled in brackets 310 and 311 secured to base 12 between ways 20. Shaft 302 is driven by servo motor 304 through belt drive 306. Coupling 308 includes header plate 318, ball screw nut 320 coupled to plate 318 and bracket 322 connected to plate 318 by arms 324. Bracket 322 would be secured to the underside of table 18. Arms 324 provide thermal isolation and filter out any weave so as to provide the same precision movement of table 18 as is provided for column 14. Drive 300 is similar in all other respects to cross feed drive 100.

Figure 10:
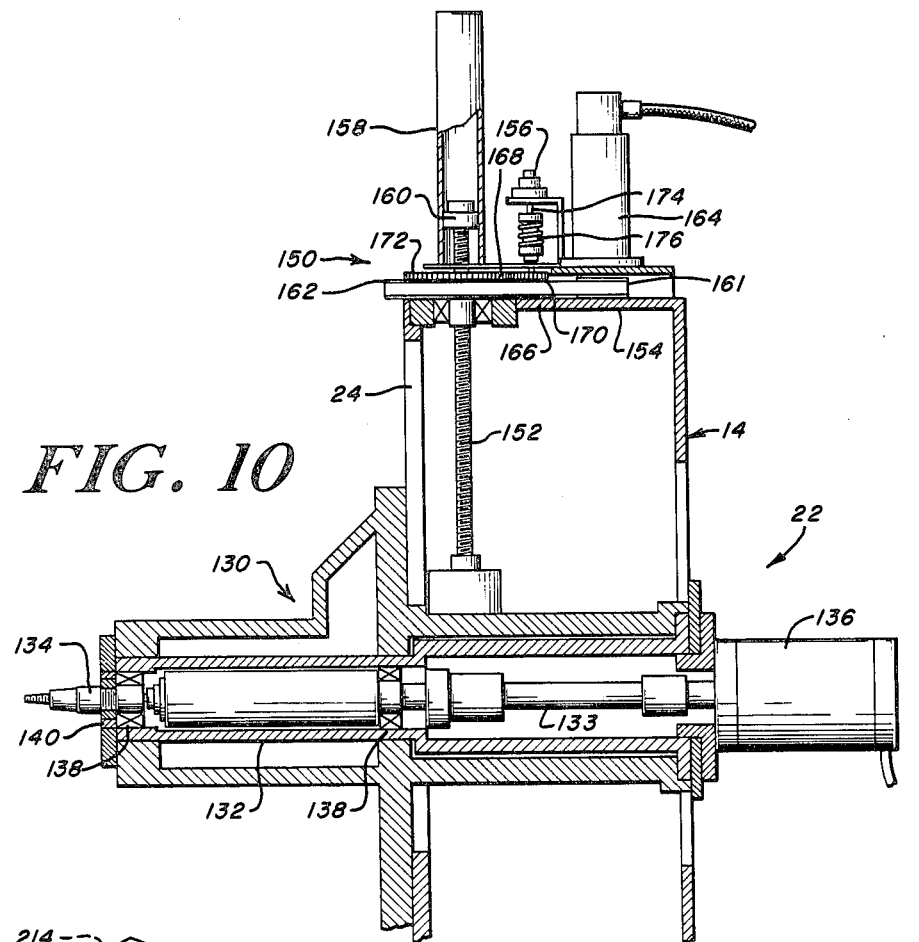
FIG. 10 is a cross-sectional side view of the wheel housing taken along the line 10—10 of FIG. 2.

Wheel housing 22 will now be described with reference to FIG. 10. Housing 22 includes wheel support structure 130 which rides on ways 24, cartridge 132 which is supported within structure 130, spindle shaft 134 which rotates within cartridge 132 and motor 136 which drives shaft 133. Spindle shaft 134 is journaled within cartridge 132 by a plurality of double rows of bearings 138 which provide nearly frictionless and precision mounting thereof. The outer end of cartridge 132 is mounted onto support structure 130 by flange 140. Provided on the outer end of shaft 134 projecting from flange 140 is a screw threaded tapered seat for mounting of a grinding wheel 40 affixed to wheel sleeve 135.

Wheel support structure 130 is raised or lowered along ways 24 for positioning grinding wheel 40 with respect to table 18 by down feed drive 150. Down feed drive 150 allows for the provision of internal cycle dress on the wheel and thus controls the geometry of wheel 40. Down feed 150 drive includes a threaded shaft 152 one end of which is non-rotatably mounted in support structure 130, belt drive 154, brake 156, protective cylindrical casing 158 and flange 160 on the other end of shaft 152 to limit downward travel of shaft 152.

Belt drive 154 includes a DC servo motor 164, a pulley 161 coupled to the motor shaft and a pulley 162 which is coupled to pulley 161 by belt 166. Belt 166 is typically a timing belt and motor 164 and pulley 162 comprise a reduction unit so as to provide the desired precision of movement of wheel housing 22. The interior of pulley 162 is threaded to mesh with shaft 152 so that rotation of pulley 162 by motor 164 produces an upward or downward movement of shaft 152, depending upon the direction of rotation of motor 164. Support bracket 168 supports casing 158 in the desired position.

Pulley 162 rests on the exterior of the housing of column 14 on bearings disposed therebetween, and is held in fixed axial relation thereto. Typically, variable movement in the range up to 60 inches per minute at continuous speeds or incrementally is permitted with a resolution of 0.00005 of an inch. This resolution is permitted not only by the belt reduction unit but by the precision machining of the threads in shaft 152.

Brake 156 will now be described with reference to FIG. 10. When power is no longer supplied to motor 164, either because the machine has been turned off or because of the unplanned interruption of power, the weight of housing 22 tends to cause it to drop downwardly by inducing rotation of pulley 162 and thus of motor 164. In precision grinding operations, even a drop of a few thousandths of an inch upon interruption of power while the grinding wheel 40 is still rotating could inexorably damage the workpiece beyond repair by providing a cut below the desired level in one particular location. In order to prevent such an occurrence, brake 156 has been provided to not only prevent grinding wheel 40 from dropping downwardly but to actually raise it off the workpiece upon interruption of power to properly protect the workpiece.

Brake 156 is a known permanent magnet brake having a hysteresis rotor 174 disposed in a permanent magnetic field. Brake 156 is coupled to pulley 162 by meshed gears 170 and 172, gear 170 being disposed on the rotor 174 of brake 156 and gear 172 being secured to one side of pulley 162 coaxially therewith. Any rotation of pulley 162 induced by the downward movement of shaft 152 is immediately and instantaneously prevented by the opposing magnetic field generated by the rotation of the rotor of brake 156. In addition, not only is the downward movement of shaft 152 prevented but immediately upon application of torque to the rotor 174 of brake 156 in the direction produced by a downward force applied to shaft 152, a spring effect or counter-rotation of the rotor 174 is produced, thus actually lifting shaft 152 upwardly and raising grinding wheel 40 off the workpiece a small fraction of an inch upon the termination of power to motor 164. In this manner, the workpiece is never damaged when power is interrupted. This spring effect of brake 156 causing motion of rotor 176 in an opposite direction is a result of the hysteresis found in any magnetic field.

During normal upward and downward movement of shaft 152 induced by motor 164, rotor 174 is preferably coupled to gear 172 by a known wrapped spring, one-way clutch 176, so that rotor 174 only rotates when shaft 152 moves in a downwardly direction but does not rotate when shaft 152 is raised. In this manner, the amount of heat generated by brake 156 is minimized, thus the braking effect is enhanced and the life thereof is prolonged, because heat build-up induced in brake 156 reduces the braking effect thereof and causes bearing wear. A brake 156 is preferred in which the torque thereof can be adjusted, so that the desired level of braking action can be selected for optimal performance. It should be noted, that rotor 174 may be directly coupled to gear 170 by a shaft and that clutch 176 only illustrates a preferred manner of accomplishing the braking function.

Figure 11:
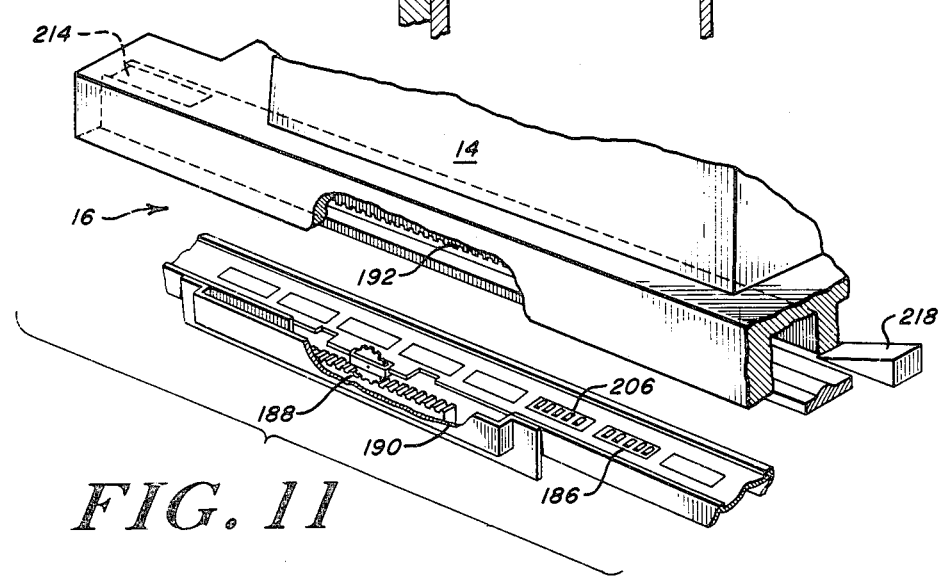
FIG. 11 is an exploded, partial perspective view of the cross-feed ways of FIG. 2.
Figure 12:
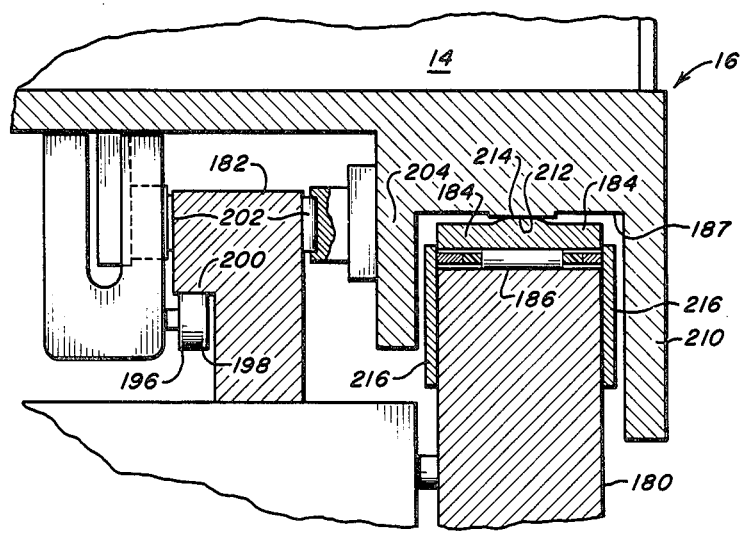
FIG. 12 is partial cross-sectional view taken along the lines 12—12 of FIG. 2.
Figure 13:
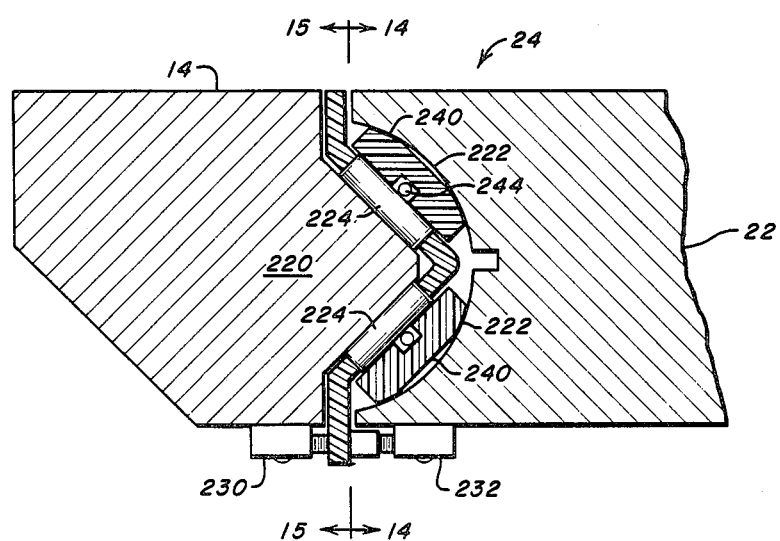
FIG. 13 is a partial cross sectional view taken along the lines 13—13 of FIG. 2.

Cross feed ways 16 will now be described with particular reference to FIGS. 11 and 12. It is important in a cross feed drive that column 14 be maintained precisely perpendicular to table 18 and ways 20 to provide the precision grinding desired. It is also important that a cross feed drive be as frictionless as possible, uninterrupted, and that it not produce any vertical variations in the position of column 14 and thus in grinding wheel 40. Ways 16 accomplish these goals, as will be described. Ways 16 include a pair of way bars 180, and guide rail 182, and associated with each bar 180 is a shoe 184, roller bearing cage 186, pinion gear 188, rack 190 disposed on bar 180 and a rack 192 disposed on column 14.

Way bars 180 are typically formed separately from the base 12 and are precisely aligned thereon and grouted thereto after formation of base 12. Typical grouting material which can be used is Sikadur. Bars 180 extend from the edge of portion 36 at one end, through tunnel 42 so that their other ends project through apertures 194 disposed in base 12 below ways 20. (See FIGS. 2 and 3) Thus, column 14 is supported by base 12 along its length of travel. Guide rail 182 is secured to base 12 between bars 180 and extends into tunnel 42 parallel thereto. At least two preloaded roller blocks 196 are secured to column 14 so that the wheel 198 thereof rides in continual contact with the underside of shoulder 200 of rail 182. Roller block 196 is spring loaded to preload undersurfaces 187 of column 14 downwardly against ways 16 during movement thereof. Recirculating bearings 202 are also provided on downwardly projecting walls 204 of column 14 on each side of guide rail 182 and ride along the opposed outer surfaces of guide rail 182 to laterally guide movement of column 14 along ways 16.

Resting directly on top of each bar 180 is a roller bearing cage 186 which rides therealong. Cage 186 has a plurality of groups of needle roller bearings 206 which are horizontally captured within correspondingly formed slots formed within cage 186 which are oriented to travel along the length of bar 180. A pinion gear 188 is positioned on a lateral edge of each cage 186, and pinion gear 188 is rotated by a meshed rack 192 disposed on the undersurface of column 14 between lateral walls 204 and 210 and by a meshed rack 190 disposed on the outer edge of bar 180 to advance cage 186 along bar 180 in synchronization with column 14. Racks 190 and 192 insure that cage 186 always remains properly aligned with column 14 within the cavity formed by walls 204 and 210, and that cage 186 always remains under the loaded portion of column 14 and never projects beyond bars 180. Typically, cage 186 moves at one half the speed of column 14. Resting on top of cage 186 and captured between cage 186 and the under surface 187 of column 14 is shoe 184 which is permitted to rotate about an axis parallel to its length with respect to column 14 and cage 186.

Formed on the upper surface of shoe 184 facing under surface 187 is a laterally rounded ridge 212 which is disposed generally at the transverse center of shoe 184 and which extends along the entire length of shoe 184. Formed directly opposite ridge 212 on undersurface 187 of column 14 are mating, downwardly projecting pads 214 which are disposed intermittently along the length of shoe 184. Shoe 184 is retained in position by the weight of column 14 and the preload applied by roller block 196, and by at least two flexible fastenings (not shown) across ridge 212 and pads 214 to constrain shoe 184 along the axis parallel to its length. Column 14 rests on ridges 212 and all of the weight thereof is transmitted from pads 214 to ridge 212 on each shoe. Shoes 184 extend beyond pads 214 beneath column 14 to allow shoes 184 to flex at either end.

The desired precisely vertical orientation of column 14 is maintained by the interaction between pads 214 and ridge 212 on each shoe 184. Since ridges 212 are rounded, shoes 184 are permitted to rotate about an axis parallel to ways 16 with respect to pads 214 to accommodate imperfections in the ways, to allow column 14 to remain in the desired precisely vertical orientation. In this manner, once column 14 is properly positioned in a vertical orientation, the interaction between pads 214 and ridges 212 allow column 14 to be self-adjusting and to always be maintained in a vertical orientation, regardless of minor imperfections in ways 16 or distortions due to wear, thermal gradients, machining deviations, and so forth. Cage 186 is surrounded by an oil bath, and this oil bath is held in place by shoe 184 and lateral walls 216 which are disposed on either side of bar 182 and which extend upwardly to the proximity of shoe 184. Because of the lack of interconnection between shoe 184, cage 186 and undersurface 187 and because of the presence of an oil bath, as column 14 is moved along ways 16, oil present between shoe 184 and the upper surface of cage 186, and the lower surface of cage 186 and bar 180 is squeezed therebetween as a load carrying pad 214 moves thereover, providing a cushioning effect to the cross feed movement of column 14, and rendering the motion of column 14 smooth and uninterrupted. The preload applied by roller block 196 assures that all of the oil will always be squeezed from between shoe 184, 186 and bar 180 so that no film of oil will be present therebetween beneath a pad 214 to disrupt the precisely vertical orientation of column 14. This feature combined with extended length of shoe 184 beyond pads 214 eliminates needle roller entry disturbances, and is facilitated by the extremely small size of needle bearings 206. This self-correcting feature and entry-softening feature preserves the integrity of this machine for life and maintains its squareness. This entire system produces one-tenth the kinetic coefficient of friction and one-twentieth the static coefficient of friction of existing feeds and allows 0.00005 of an inch incremental slide positioning. A wedge shaped bearing pad 218 is positioned between a rear pad 214 and the rear edge of ridge 212 on each shaft 184. Pad 218 may be inserted as far as is necessary to provide the desired rotation of column 14 about an axis generally parallel to ways 20 until column 14 is positioned in its desired precisely vertical orientation. Pad 218 is permanently inserted, once the machine has been installed as a final adjustment thereto.

Ways 24 will now be described with particular reference to FIGS. 13–16 and are similar in many respects to ways 16, except that ways 24 are V-shaped. Ways 24 include V-shaped rails 220 formed on either side of column 14 which inwardly project into channels 222 formed on opposite sides of housing 22. Rails 220 are preloaded inwardly toward one another to insure precise alignment and precision movement of housing 22 and to prevent twisting of assembly 22 under heavy loads. Disposed in each way 24 sandwiched between rail 220 and channel 222 are two connected sets of roller bearing cages 224 forming a V-shaped configuration conforming to rail 220 and having parallel, separated groups of needle roller bearings 226 similar to bearings 206. One set of cages is disposed on each surface of the V-shaped ways. Disposed on a lateral surface of one set of cages 224 is a pinion 228 which rides in a rack 230 formed on an adjacent rail 220 and in a rack 232 formed on an adjacent channel 222. Both sets of cages 224 ride at one-half the speed of housing 22 upwardly and downwardly within the ways 24, in a manner similar to cages 186, as pinion gear 234 rides in racks 230 and 232. This action maintains cages 224 in the loaded parts of ways 24. Bearings 226 are held within cages 224 by taut wires 236 which run the length of each cage 224 and are anchored at each end on rails 220 by brackets 238. Wires 236 are suspended above the surface of bearings 226 and merely serve to prevent bearings 226 from falling out of cages 224 due to the force of gravity. Captured between each set of cages 224 and the inner surface of channel 222 is a plurality of shoes 240 spaced along the length of channel 222. As wheel housing 22 rides upwardly and downwardly within column 14, frictionless movement thereof is insured by cages 224 riding between shoes 240 and the outer surfaces of rail 220. Shoes 240 are interconnected by wires 241, and wires 241 are held taut and are anchored by plates 243 at each end of channel 222. The interior surfaces of channel 222 confronting shoe 240 are rounded with a rounded cross-section configuration, and confronting surfaces of shoe 240 are also rounded. Thus shoes 240 are cradled within channels 22 and are permitted to rotate about an axis parallel to their length with respect to channels 222 to maintain the desired alignment, and to accommodate imperfections in ways 24. A slot 244 is provided in the face of shoe 240 confronting cage 224 to accommodate wire 236 and to permit frictionless movement of cage 224.

Figures 14, 15, 16:
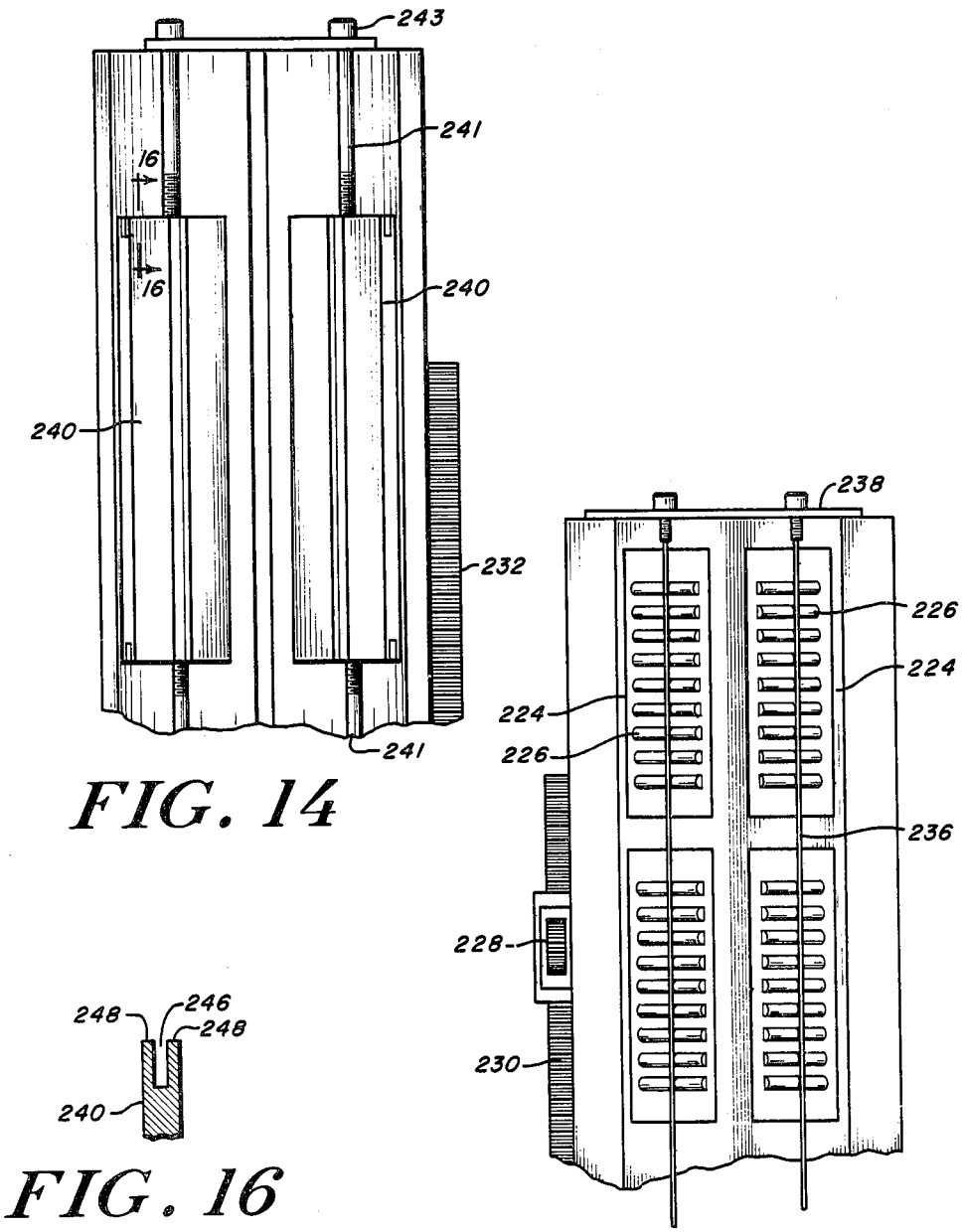
FIG. 14, is a view taken in the direction of arrow 14 in FIG. 13.
FIG. 15 is a view taken in the direction of arrow 15 in FIG. 13.
FIG. 16 is a cross-sectional view taken along the line 16—16 of FIG. 14.

In a further feature, the ends of each shoe 240 are provided with a laterally extending slot 246 as shown in FIG. 16. Slot 246 allows the projecting arms 248 on either side thereof to flex as the load is shifted over the ends or towards the ends of shoes 240, thus providing a smooth and cushioned advance of housing 22 along ways 24.

Machine 10 may be completely computer controlled, if desired, by use of control panel 26. Panel 26 includes a CRT 250 for display of performance data and for selection of a program, keyboard 252 for introducing the desired program operation, and keyboard 253 for introducing data into the computer, a stop button 254 for emergency stops, and assorted signal lights 256 indicating problems or particular stages in the operation of the machine. Also included in this sytem is a microprocessor 258 for controlling the machinery. Preferably, panel 26 is disposed to the left side of machine 10 to provide the desired visibility and access thereto. Vertical containment walls 30 may also be provided surrounding table 18 for protection of the operator and others from coolant fluid and the byproducts of grinding, if desired. If walls 30 are included, a sliding window 32 is disposed in walls 30 opposite column 14 to gain access to the workpiece positioned on table 18. Window 32 typically slides to the left, as shown in FIG. 1, which is the direction of rotation of grinding wheel 40, for safety purposes. Since grinding wheel 40 rotates in a clockwise direction, facing the machine of FIG. 1, any cooling fluid and sparks and the like are flung toward containment wall 30 on the left, as shown in FIG. 1.

If desired, this machine may also be manually controlled and set up by use of manual control panel 28. Panel 28 is provided to the right of window 32 and includes assorted controls 260 for manually operating grinding wheel 40 and a stop button 262. Control panel 28 is mounted on a rail 264 to allow sliding motion thereof from the right during non-use toward the left (as shown in FIG. 1), to allow the operator to position it and in a location where he can observe an operation being performed by grinding wheel 40 during use. In addition, panel 28 is recessed below overlying wall 266 to minimize the amount of dirt and other debris which falls upon panel 28. Cable 268 provides electrical connections between panel 28 and the apparatus, and cable 268 is sufficiently long to provide the desired range of sliding movement of panel 28.

Secured to the top of table 18 is a chuck 91 for holding a workpiece 90. Chuck 91 is typically a conventional magnetic chuck. Coolant fluid may be introduced to workpiece 90 by hoses 270 and the flow of coolant fluid may be regulated by valve 272, in a conventional manner. Disposed beneath table 18 at each end is a cover 274 which helps prevent debris from falling beneath table 18 and onto base 12 during movement of table 18. Preferably cover 274 moves at about one-half the speed of table 18 and is driven from belt drive 50 by a cable reduction unit or other means.

The grinding machine of this invention is capable of performing either pendulum type grinding operations, shortstroke grinding, or creep feed grinding. It is not dedicated to either one of these particular types of operations. Each operation may be performed without modifications to the machine, and may be performed in any sequence and at any time desired. The maximum length of stroke drive 50 is typically 50 inches while the minimum length of stroke is 0.4 inches. The maximum speed of drive 50 is 100 ft/min, and the minimum speed is 0.4 inches/minute and the maximum rate is greater than 200 strokes per minute. This machine further overcomes the problems associated with prior art hydraulic table drive systems. This machine also permits deeper cuts than conventional grinding and adds efficiency, and power transmission to the machine table. The magnetic brake prevents accidental damage to the workpiece due to power interruption and requires no external power sources. Other sources of error due to screw nut weave and thermal energy generated thereby are eliminated by coupling 108. The movable manual control panel eliminates fixed hand wheel controls and devices and the computer controlled panel allows pre-programming of the device to perform any operation desired in any sequence desired including two or three axis grinding. Cross feed drive 100 and down feed drive 150 permit precise positioning of grinding wheel 40 and can be moved with increments of 0.00005 of an inch.

In view of the above description, it is likely that modifications and improvements may occur to those skilled in the art within the scope of this invention. Thus, the above description is intended to be exemplary only, the scope of the invention being defined by the following claims and their equivalents.

What is claimed is:

1. A surface grinding machine comprising:
   a molded, unitary base;
   a first pair of parallel ways disposed on said base and extending in a first direction, said first set of ways being supported along their entire length by said base;
   a table moveable along said first set of ways, said table having means for securing a workpiece thereto;
   a second set of parallel ways disposed on said base in non-intersecting relation with said first ways and extending in a second direction normal to said first direction, said second set of ways being fully supported along their entire length by said base and extending beneath said first pair of ways across the width thereof; and a column having a rotatable grinding wheel disposed thereon for performing work on a workpiece on said table, said column being moveable along said second set of ways.

2. A machine as recited in claim 1 wherein said base is formed of a molded epoxy-granite mixture.

3. A machine as recited in claim 1 or 2 wherein said first set of ways are formed integrally with and of the same material as said base.

4. A machine as recited in claim 1 further comprising a belt drive for moving said table along said first set of ways.

5. A machine as recited in claim 4 wherein said belt drive comprises:
   a bracket secured to said table and suspended therebeneath;
   a continuous, elongated belt, the ends of said belt being secured to opposite sides of said bracket, said belt being wrapped around a plurality of pulleys in a plurality to form multiple strands;
   a servo motor having a rotor rotatable in both directions at a selected speed and for a selected time duration for driving said belt;
   a belt drive reduction unit coupling said servo motor to said belt; and
   means for tensioning said loops of said belt.

6. A machine as recited in claim 5 wherein said belt has four strands and is wrapped in one large loop and two smaller loops disposed within the larger loop, the two smaller loops being on opposite sides of said bracket.

7. A machine as recited in claim 6 wherein said belt drive further comprises two idler pulleys journaled in said bracket, one of said pulleys being associated with each of said smaller loops.

8. A machine as recited in claim 1 wherein said second ways pass beneath said first ways through a tunnel within said base, said machine further comprising:
   a bridge support disposed within said tunnel and extending parallel to said second ways;
   a toe formed on said column on a side facing said table and adapted to travel into said tunnel; and
   a slot formed in said toe to accommodate said support.

9. A machine as recited in claim 1 further comprising a ball screw nut drive for moving said column along said second set of ways.

10. A machine as recited in claim 9 wherein said ball screw nut drive comprises:
    a threaded shaft journaled in said base;
    a servo motor;
    means of coupling said servo motor to said shaft;
    a ball screw nut threadably coupled to said shaft;
    a header plate secured to said ball screw nut;
    a bracket secured to the underside of said column;
    a pair of somewhat elastic arms coupling said header plate to said bracket for mechanically and thermally isolating said bracket from said ball screw nut.

11. A machine as recited in claim 1 further comprising:
    a housing supporting said grinding wheel disposed in said column;
    vertical ways disposed on opposite sides of said wheel housing for allowing said wheel housing to move vertically within said column;
    drive means for selectively raising and lowering said wheel housing; and
    brake means for preventing said wheel housing from moving downwardly upon interruption of power applied to said drive means.

12. A machine as recited in claim 11 wherein said brake means comprise:
    a permanent magnet brake;
    means for coupling said permanent magnet brake to said drive means; and
    means for varying the braking torque applied by said permanent magnet brake.

13. A machine as recited in claim 12 wherein said coupling means comprises a one-way clutch coupling said permanent magnet brake to said drive means only when said wheel housing is moving in a downwardly direction.

14. A machine as recited in claim 12 or 13 wherein said drive means comprises:
    a DC servo motor;
    a threaded shaft non-rotatably coupled to said wheel housing;
    a rotatable pulley threadably coupled to said shaft and being in a fixed, vertical relationship with respect to said column; and
    a belt coupling said servo motor to said pulley.

15. A machine as recited in claim 1 wherein the second set of ways comprises:
    a pair of parallel bars mounted on said base and having a flat upper surface disposed in confronting relation with a pair of flat surfaces disposed on the undersurface of said column; and
    low friction means disposed between each of said column surfaces and said upper surface of each of said bars.

16. A machine as recited in claim 15 wherein said low friction means comprises:
    a plurality of groups of needle bearings aligned to roll parallel to the direction of movement of said column;
    a cage for retention of said needle bearings;
    a bearing shoe captured between said cage and said column surface; and
    an oil bath surrounding said cage and said shoe.

17. A machine as recited in claim 16 wherein said low friction means further comprise:
    a pinion gear disposed on a lateral edge of said cage;
    a first rack disposed on said column surface for mating with said pinion gear;
    a second rack disposed on a lateral surface of said bar for mating with said pinion gear, said first rack and said second rack and said pinion gear cooperating to advance said cage along said rail in synchronization with movement of said column.

18. A machine as recited in claim 17 wherein said first rack and said second rack and said pinion gear move said cage at a speed one-half the speed of movement of said column and in the same direction as said column.

19. A machine as recited in claim 16 wherein said column surface comprises a plurality of spaced pads and wherein said shoe comprises a centrally disposed, rounded ridge extending along a surface thereof and having said pads resting thereon, said pads and said shoe ridge cooperating to permit lateral rotation of said shoe with respect to said column surface to maintain said column in a precisely vertical orientation with respect to said table.

20. A machine as recited in claim 15 or 19 further comprising means for preloading said column downwardly against said bars.

21. A machine as recited in claim 20 wherein said preloading means comprises:
   a guide rail disposed on said base and extending generally parallel to said bars, said guide rail having a shoulder facing downwardly toward said base; and
   a plurality of preloaded rollers which ride along said downwardly-facing shoulder on said rail, and which are secured to said column.

22. A machine as recited in claim 11 wherein each of said vertical ways comprises;
   a channel disposed in said wheel housing;
   a V-shaped rail disposed on said column and adapted to ride in said channel said rail having two surfaces in confronting relationship with two surfaces of said channel; and
   low friction means disposed between said two confronting surfaces of said channel and said rail.

23. A machine as recited in claim 22 wherein said low friction means comprises:
   a plurality of needle roller bearings disposed along each of said confronting surfaces and being aligned to roll in the direction of movement of said wheel housing;
   a pair of sets of cages for retaining said needle roller bearings, one set being associated with each confronting surface;
   means for linking cages in one set with adjacent cages in the other set;
   shoe means disposed between each said cage and said confronting surfaces of said channel, said shoe means having a rounded surfaces on a side thereof facing said confronting surfaces of said channel to permit rotation of said shoe with respect to said channel about an axis parallel to the direction of movement of said wheel housing, each said shoe means having a slot on the surface thereof facing said cage to accommodate said wire.

24. A machine as recited in claim 23 wherein each of said shoes is provided with a transverse slot on each end thereof extending in a direction generally parallel to the shoe surface facing said cage.

25. A machine as recited in claim 1 further comprising pre-programmable computer means for controlling and monitoring movement of said table, said column and said wheel housing within said column, said computer means being programmable to allow performance a plurality of grinding operations by said grinding wheel on a workpiece on said table in the desired sequence, in the desired order, for the desired length of time and in the desired location on the workpiece.

26. A machine as recited in claim 25 wherein said computer means comprises:
   a CRT screen for displaying information thereon;
   a first keyboard means for programming said computer means;
   a second keyboard for entering data into said computer means;
   a STOP button for manually interrupting operation of said machine in an emergency; and
   display lights for monitoring conditions in said machine.

27. A machine as recited in claim 1 or 25 further comprising:
   a control panel for manually operating said machine and for manually setting up said machine;
   means for shielding said control panel from operations performed on a workpiece on said table; and
   a horizontal rail for permitting said control panel to be slid to a desired position, including a position adjacent to said table and a position remote from said table.

28. A machine as recited in claim 1 further comprising a plurality of nearly vertical stationary walls enclosing said table.

29. A surface grinding machine comprising:
   a base;
   a first pair of parallel ways disposed on said base and extending in a first direction;
   a table moveable along said first set of ways;
   a second set of parallel ways disposed on said base and extending in a direction normal to said first set of ways;
   a column moveable along said second set of ways and containing a rotatable grinding wheel for performing work on a workpiece on said table; and
   means for moving said table along said first set of ways, said moving means comprising:
      a bracket secured to the underside of said table and suspended therefrom;
      a continuous belt wrapped about a plurality of pulleys to form one large loop and two smaller loops within said large loop, said smaller loops being on opposite sides of said bracket, the ends of said belt being secured to said bracket on opposite sides thereof;
      a plurality of pulleys for forming said loop and guiding said belt;
      a servo motor for driving said belt;
      a belt reduction unit coupling said servo motor to said belt; and
      means for tensioning said belt to provide the desired degree of stiffness thereto.

30. A surface grinding machine comprising:
   a base;
   a first pair of parallel ways disposed on said base and extending in a first direction;
   a table moveable along said first set of ways;
   a second set of parallel ways disposed on said base and extending in a direction normal to said first direction;
   a column moveable on said second set of ways;
   a housing disposed in said column and containing a rotatable grinding wheel for performing work on a workpiece disposed on said table, said housing being moveable vertically with respect to said column; and
   means for driving said housing vertically within said column, said driving means comprising:
      a threaded shaft nonrotatably secured to said housing;
      a rotatable pulley threadably coupled to said shaft and disposed in fixed vertical relation with respect to said column, rotation of said pulley moving said shaft vertically along its axis;
      a permanent magnet brake for preventing rotation of said pulley upon interruption of power to said motor; and
      a one-way clutch coupling said permanent magnet brake to said pulley only when said housing and said shaft are moving downwardly within said column.

31. A surface grinding machine comprising:
   a base;

a first pair of parallel ways disposed on said base and extending in a first direction;

a table moveable along said first set of ways;

a second set of parallel ways disposed on said base and extending in a direction normal to said first direction;

a column moveable on said second set of ways; and means for driving said column along said second set of ways, said driving means comprising:
  a threaded shaft journaled in said base;
  a servo motor coupled to said threaded shaft for rotation thereof in a desired direction;
  a ball screw nut threadably coupled to said shaft and moveable along said shaft in response to rotation thereof;
  a header plate secured to said ball screw nut;
  a bracket secured to said column; and
  a pair of generally flexible arms coupling said header plate to said bracket for thermal and mechanical isolation of said bracket from said ball screw nut.

32. A surface grinding machine comprising:

a base;

a first pair of parallel ways disposed on said base and extending in a first direction;

a table moveable along said first set of ways;

a second pair of parallel ways disposed on said base and extending in a direction normal to said first set of ways;

a column moveable on said second direction; and each of said second ways comprising:
  a bar mounted on said base and having a flat upper surface facing a lower confronting surface of said column;
  a cage resting on said bar and containing a plurality of groups of needle roller bearings aligned to rotate in the direction of movement of said column;
  rack and pinion means for advancing said cage in synchronization with said column;
  a shoe disposed between said cage and a lower confronting surface of said column;
  a centrally disposed, rounded ridge extending along the length of said shoe on a surface facing said lower confronting surface of said column;
  a plurality of pads disposed on said lower confronting surface of said column and resting on said ridge to space said lower confronting surface from said shoe to permit said shoe to rotate with respect to said column about said ridge;
  an oil bath surrounding said shoe and said cage; and
  means for preloading said column downwardly against said bar.

33. A surface grinding machine comprising:

a base;

a first pair of parallel ways disposed on said base and extending in a first direction;

a table moveable along said first set of ways and adapted to carry a workpiece;

a second set of parallel ways disposed on said base and extending in a direction normal to said first direction;

a column moveable along said second set of ways;

a pair of parallel vertical ways disposed in said column and extending perpendicular to said first and said second sets of ways; and a wheel housing moveable along said vertical ways and containing a grinding wheel for performing work on a workpiece on said table;

said vertical ways each comprising:
  a channel disposed in said wheel housing;
  a V-shaped rail extending into and riding in said channel said rail having two surfaces in confronting relationship with two surfaces of said channel;
  a plurality of aligned shoes disposed between each of the two confronting surfaces of said rail and said channel;
  a pair of sets of cages containing a plurality of needle roller bearings, one set of cages being disposed between each confronting surface of said rail and its associated said shoes;

means for linking cages in one set with adjacent cages in the other set;

a taut wire extending the length of said cages along each confronting rail surface for pinning said cages against said confronting rail surface; and rack and pinion means for moving said linked cages in synchronization with motion of said wheel housing;

each of said shoes having a rounded surface cradled in a correspondingly rounded surface of said channel to permit rotation of said shoes about a vertical axis for self-alignment thereof, each said shoe having a slot extending along its length for receiving said wire.

34. A surface grinding machine comprising:

a base;

a table moveable along said base in a first direction;

a column moveable along said base in a second direction normal to said first direction toward and away from said table;

a wheel housing disposed within said column and including a rotatable grinding wheel for performing work on a workpiece disposed on said table;

means for moving said table horizontally on said base;

means for moving said column horizontally on said base;

means for moving said wheel housing vertically within said column toward and away from said table;

pre-programmable computer means for controlling operation of said table moving means, said column moving means and said housing moving means and for monitoring operation thereof;

a manually operated control panel for controlling operation of said table moving means, said column moving means, and said housing moving means, operation of each of said table moving means, said column moving means and said housing moving means of said surface grinding machine being selectively controlled by one of said pre-programmable computer means and said manually operated control panel; and means for permitting manual sliding of said control panel horizontally along said base from a position remote from said table to a position adjacent to said table.

* * * * *